United States Patent
Yokota

(10) Patent No.: US 7,099,508 B2
(45) Date of Patent: Aug. 29, 2006

(54) DOCUMENT IDENTIFICATION DEVICE, DOCUMENT DEFINITION METHOD AND DOCUMENT IDENTIFICATION METHOD

(75) Inventor: Kazuaki Yokota, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 726 days.

(21) Appl. No.: 10/305,193

(22) Filed: Nov. 27, 2002

(65) Prior Publication Data

US 2003/0190094 A1 Oct. 9, 2003

(30) Foreign Application Priority Data

Nov. 29, 2001 (JP) ............... 2001-364813
Nov. 29, 2001 (JP) ............... 2001-364815

(51) Int. Cl.
*G06K 9/34* (2006.01)

(52) U.S. Cl. ..................... 382/173
(58) Field of Classification Search ................ 382/173
See application file for complete search history.

(56) References Cited

U.S. PATENT DOCUMENTS

| | | | | |
|---|---|---|---|---|
| 4,811,408 A | * | 3/1989 | Goldman | 382/115 |
| 5,555,556 A | * | 9/1996 | Ozaki | 382/173 |
| 5,655,027 A | * | 8/1997 | Dunn | 382/173 |
| 5,852,676 A | * | 12/1998 | Lazar | 382/173 |
| 5,926,565 A | * | 7/1999 | Froessl | 382/181 |
| 6,356,655 B1 | * | 3/2002 | Sumikawa et al. | 382/175 |
| 6,501,864 B1 | * | 12/2002 | Eguchi et al. | 382/306 |
| 6,859,797 B1 | * | 2/2005 | Skopicki | 706/20 |

FOREIGN PATENT DOCUMENTS

| | | |
|---|---|---|
| JP | 2-8976 | 1/1990 |
| JP | 5-62011 | 3/1993 |
| JP | 7-168910 | 7/1995 |
| JP | 2000-293625 | 10/2000 |

\* cited by examiner

*Primary Examiner*—Joseph Mancuso
*Assistant Examiner*—Yuzhen Ge
(74) *Attorney, Agent, or Firm*—Oblon, Spivak, McClelland, Maier & Neustadt, P.C.

(57) ABSTRACT

A plurality of document definition information for identifying documents, and format control information for recognizing a character recorded on a document corresponding to each of the plurality of document definition information are held beforehand, documents targeted for character recognition are identified as specific documents based on document images of the entered documents targeted for character recognition and the document definition information and, based on a result of the identification, character recognition is executed by using corresponding format control information. A document definition device adds a plane area of each of documents to be identified to the document definition. An OCR device checks the plane area on the document by using the document definition before check of a preprint accompanied by character recognition.

14 Claims, 11 Drawing Sheets

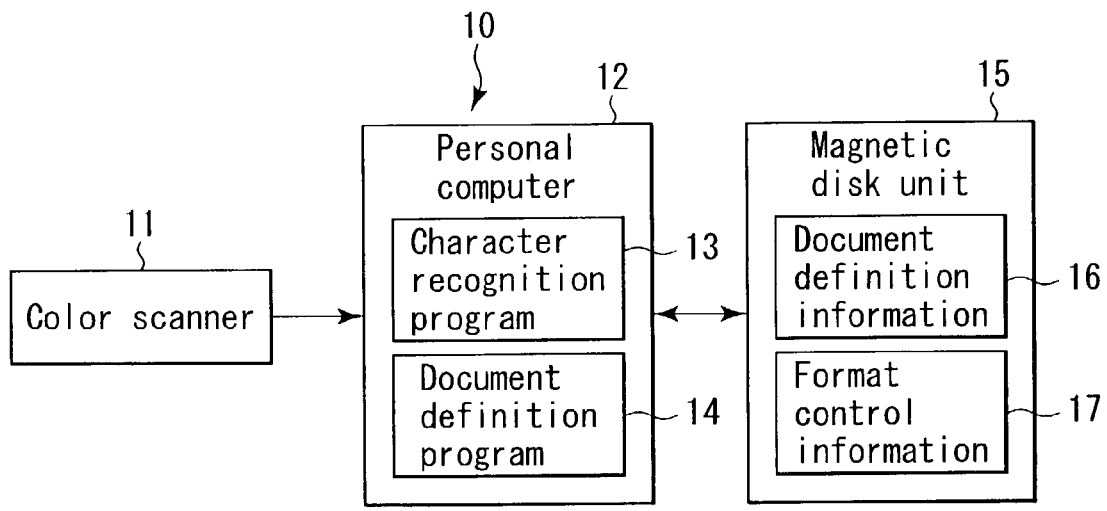

FIG. 1

| Type | Item | Content of definition |
|---|---|---|
| Document identification item | Document size | Vertical and horizontal lengths of document |
| | Corner cut | Position(upper right, lower right, upper left, and lower left), size(width, and height) |
| | Binding hole | Position(coordinate where upper left is origin), diameter of hole |
| | Preprint | Position(coordinate where upper left is origin), area width, area height, character size, font, character string, color |

FIG. 2

| Type | Item | Setting content |
|---|---|---|
| Document identification item | Document size | Vertical and horizontal lengths of document |
| | Corner cut area | Position(upper right, lower right, upper left, and lower left), size(width, and height) |
| | Binding hole | Position(coordinate where upper left is origin), diameter of hole |
| | * Plane area | Position(coordinate where upper left is origin), area width, area height |
| | Preprint area | Position(coordinate where upper left is origin), area width, area height, character size, font, pitch, character string, color |
| Character recognition item | Character recognition area | Position(coordinate where upper left is origin), area width, area height, character size, font, pitch, character string, color |

FIG. 10

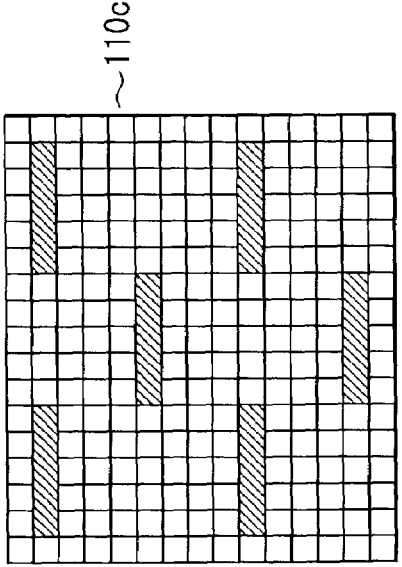

FIG. 16A

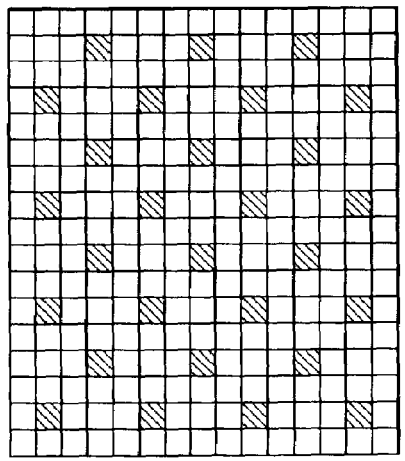

FIG. 16B

| Type | Item | Setting content |
|---|---|---|
| Document identification item | Document size | Vertical and horizontal lengths of document |
| | Corner cut area | Position(upper right, lower right, upper left, and lower left), size (width, and height) |
| | Binding hole area | Position(coordinate where upper left is origin), diameter of hole |
| | Preprint area | Position(coordinate where upper left is origin), area width, area height, character size, font, pitch, character string, color |
| | Plane area | Position(coordinate where upper left is origin), area width, area height |
| | *Character existing area | Position(coordinate where upper left is origin), area width, area height |
| Character recognition item | Character recognition area | Position(coordinate where upper left is origin), area width, area height, character size, font, pitch, character string, color |

FIG. 17

DOCUMENT IDENTIFICATION DEVICE, DOCUMENT DEFINITION METHOD AND DOCUMENT IDENTIFICATION METHOD

CROSS-REFERENCE TO RELATED APPLICATIONS

This application is based upon and claims the benefit of priority from the prior Japanese Patent Applications No. 2001-364813, filed Nov. 29, 2001; and No. 2001-364815, filed Nov. 29, 2001, the entire contents of both of which are incorporated herein by reference.

BACKGROUND OF THE INVENTION

1. Field of the Invention

The present invention relates to a document identification device suitably applied to a character recognition device for processing a plurality of documents, and more particularly, it relates to a document identification device suitably applied when a plurality of documents in which character strings to be identified are not arranged in fixed positions are identified in accordance with document definition.

2. Description of the Related Art

Furthermore, the present invention relates to a document definition method which is used in carrying out document identification in accordance with a plurality of identification items set for each of a plurality of documents to be identified, and a document identification method for identifying a document in accordance with document definition based on the plurality of identification items.

Heretofore, in order to generally read characters recorded on a plurality of documents in the OCR, it has been necessary to prerecord (print) an ID number in a predetermined position for document identification, in the case of a document exclusively designed for OCR reading to enable the OCR to identify the document. In the OCR, format information (form information or format control information (FC)) corresponding to the ID number has been prestored, and format information corresponding to an identified type of a document (ID number) has been used to read characters from a target document. As format information, there is information for specifying a position of a field, in which a character to be read has been recorded, on a document, a number of digits of a character to be read, a character pitch, a type of a character recognition dictionary used for reading a character letter type, or the like.

On the other hand, recently, there has been an increase in requests for reading characters recorded on an existing document not designed exclusively for OCR reading. In order to read characters recorded on the existing document, it has been necessary to execute registration of format information in the OCR, manual sorting of a plurality of existing documents in accordance with types to form a bundle for each type, and specification of format information for each bundle (1 batch) to read the characters.

Furthermore, in order to read characters recorded on a document, coordinate information of a character writing section (ruled line) on the document and format information have been preregistered in the OCR correspondingly to each other, coordinate information of a ruled line has been obtained from an image of the document entered to the OCR, and compared with the preregistered coordinate information of the ruled line for each document to identify the document and, based on format information corresponding to the identified document, character reading has been executed. This method eliminates the necessities of manual sorting of documents in accordance with types before reading, and 1-batch processing of the same document during reading. Thus, a plurality of documents can be mixed to enable reading.

However, in the above-described method, if the entered document image is blurred, ruled line extraction cannot always be carried out accurately. Consequently, a problem of incorrect document identification occurs. Moreover, even in the case of documents of different types, if positions of ruled lines are completely identical, a problem of impossible identification of the documents occurs.

BRIEF SUMMARY OF THE INVENTION

Objects of the present invention are to provide a document identification device, a document definition method, and a document identification method, which can greatly increase a processing speed in document identification for identifying a document in accordance with document definition based on a plurality of identification items.

According to the present invention, in the document identification for identifying the documents in accordance with the document definition based on a plurality of identification items, in addition to document definition of a plane area of each of documents to be identified, a function of checking the plane area on each document is added, whereby a processing load necessary for character recognition is reduced to increase a processing speed of document identification.

That is, according to the present invention, a document identification device for identifying documents in accordance with document definition based on a plurality of identification items comprises document definition means for defining plane areas on the documents, and document identification means for identifying documents in accordance with document definition including identification items defining the plane areas.

According to the present invention, a document identification method for identifying documents in accordance with document definition based on a plurality of identification items comprises the step of identifying documents in accordance with document definition including identification items to define a plane area of each of a plurality of documents to be identified.

According to the present invention, a document identification method for identifying documents in accordance with a plurality of identification items including identification items necessary for character definition comprises the steps of defining a plane area of each of the plurality of documents to be identified, and checking identification items defining the plane area before check of the identification items necessary for character recognition.

According to the present invention, in the document identification for identifying the documents in accordance with the document definition based on the plurality of identification items, its processing speed can be greatly increased. For example, for each of the plurality of documents to be processed, a dictionary (document definition) collecting characteristics such as a document size, a binding hole area, a corner cut area, a character existing area, and a preprint area is properly corrected to be matched with the entered document. Thus, in document identification, in which a type of even a document of a character string for document identification, not arranged in a fixed position, can be identified, its processing speed can be greatly increased.

According to the present invention, in the document identification for identifying the documents in accordance with the document definition based on the plurality of document identification items, in addition to the document definition of the character existing area of each of the documents to be identified, a function of identifying documents by an area checking method for not recognizing characters of the character existing area on the document is added. Thus, a processing load necessary for character recognition is reduced to increase a speed and performance of document identification.

According to the present invention, in the document identification device for identifying documents in accordance with document definition based on a plurality of identification items including identification items necessary for character recognition, documents are identified in accordance with document definition for checking identification items defining character existing area, and a blank area secured around the character existing area before check of the identification items necessary for character recognition.

According to the present invention, a document identification method for identifying documents in accordance with document definition based on a plurality of identification items comprises the step of identifying documents in accordance with document definition including identification items defining a character existing area, or a character existing area and a blank area secured around the character existing area of each of a plurality of documents to be identified.

According to the present invention, a document identification method for identifying documents in accordance with identification items including identification items necessary for character recognition comprises the steps of defining a character existing area, or a character existing area and a blank area secured around the character existing area of each of a plurality of documents to be identified, and checking identification items defining the character existing area, or the character existing area and the blank area secured around the character existing area before check of the identification items necessary for character recognition.

By providing the document identification function of the present invention, in the document identification for identifying the documents in accordance with the document definition based on the plurality of identification items, all the document identifications including identification of a document of a nearly blank sheet can be executed highly accurately at a high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing a system configuration of an OCR according to a first embodiment of the present invention.

FIG. 2 is an explanatory view showing a document definition item which is document definition information.

FIG. 10 is a view showing an example of a field setting content of the document definition for illustrating a structure of document definition 20 according to the second embodiment of the invention.

FIGS. 16A and 16B are views showing plane area identification examples for illustrating a third embodiment of the present invention.

FIG. 17 is a view showing an example of a field setting content of document definition for illustrating a structure of the document definition according to a fourth embodiment of the present invention.

DETAILED DESCRIPTION OF THE INVENTION

Figure 3:
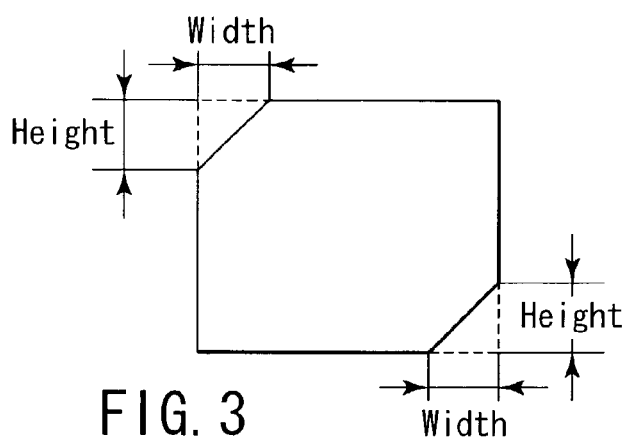
FIG. 3 is an explanatory view showing a corner cut which is a document definition item.
Figure 4:
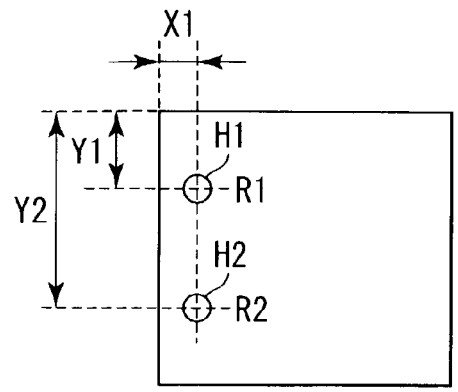
FIG. 4 is an explanatory view showing a binding hole which is a document definition item.

Next, detailed description will be made of the embodiments of the present invention with reference to the accompanying drawings. FIG. 1 is a view showing a system configuration of an OCR of the present invention. An optical character reader 10 is constituted of a color scanner 11, and a personal computer 12. In the personal computer 12, a character recognition program 13 that is OCR software for realizing character recognition, and a document definition program 14 for setting document identification information to identity a document are installed. The color scanner 11 has a function of photoelectrically converting an image of a document to output image information of three colors of RGB. This color scanner 11 has an automatic paper feeding function of taking out documents to be read one by one from a hopper, in which the documents are loaded, to feed the documents, and feeding the documents through reading positions to a stacker. The color scanner 11 photoelectrically converts an image on each of the fed documents to read the document image by a CCD color image sensor in the reading position, and outputs image information of three colors of RGB. In the color scanner 11, a normal stacker for discharging a document, characters of which have all been correctly recognized, and a reject stacker for discharging a document, on which unreadable characters (reject characters) are present, are disposed. Based on a result of character recognition in the personal computer 12, the fed document is discharged to one of the normal stacker and the reject stacker. A magnetic disk unit 15 is disposed as an external memory of the personal computer 12. In this magnetic disk unit 15, document definition information 16 and format control information 17 are stored to be registered.

The embodiment is described by way of a software character recognition type, in which an OCR is constituted of the color scanner 11 and the personal computer 12. However, the embodiment is not limited to this type. A special purpose machine may be used, in which a color scanner is integrated, and which has a character recognition function, and a document definition function for setting document identification information to identity a document. In the case of the special purpose machine, a sorter can be connected to sort documents after character recognition in accordance with types. The sorter has a plurality of document discharge pockets, and discharges identified documents to the document discharge pockets in accordance with types to sort the documents.

Document identification items defined as identification information for identifying documents are, as shown in FIG. 2, a document size, a corner cut, a binding hole, and a preprint.

Figure 5:
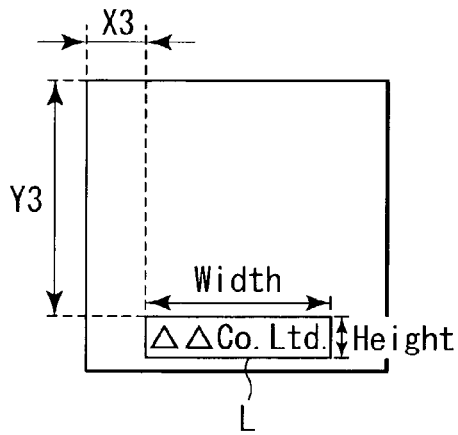
FIG. 5 is an explanatory view showing a preprint which is a document definition item.

The document size is information defined by vertical and horizontal lengths of a document. The corner cut is information defined by a position (upper right, lower right, upper left and lower left) and a size (width, and height) of a corner cut disposed at at least one of four corners of a document. FIG. 3 shows a document, in which corner cuts are disposed on lower left and right sides. For binding holes, a document is shown which has a binding hole H1 of a diameter R1 disposed in a position of a binding hole (coordinate in which an upper left of the document is an origin) (X1, Y1) disposed for filing, and a binding hole H2 of a diameter R2 disposed in a position of a coordinate (X1, Y2). The preprint is information indicating an area of a character string printed beforehand (preprinted) on a document, and information defined by a position (coordinate, in which an upper left of the document is an origin), a width, a height, a character string present in the area, a character size (number of points), a font (letter type), a character pitch, and a color. The preprint is not limited to a character, but it may be a graphic image. FIG. 5 shows a document which has a preprint area L including a character string preprinted as "ΔΔ Co. Ltd.". This preprint area is disposed in a position of a coordinate (X3, Y3), and definition of document identification items used for identifying a document is carried out by executing the document definition program 14.

When the document definition program 14 is executed, image information of an unrecorded document to be identified is read by the color scanner 11 to be displayed on a not-shown display unit of the personal computer 12. While watching the displayed document image, a user specifies a position or an area by a mouse, and enters information by a keyboard to set definition information. On a display screen, names of document identification items and an entry section of corresponding definition information are displayed.

In accordance with a request from the program to set document identification items, or specification of items from the user by the mouse, the user specifies a relevant part of the displayed document image corresponding to items for setting definition information in a rectangular form by the mouse. Within a range specified by the rectangular form, the program searches an image corresponding to the items requested to be set or specified to be set by the user to obtain information for the setting. For example, when a document size is set as a setting item, and an entire document is specified in a rectangular form, an outer shape of the document image is searched to count the number of dots of the image, vertical and horizontal lengths of the document are calculated from the counted number of dots, and resolution in photoelectric conversion of the scanner, and displayed in the entry section of the definition information.

Also for other setting items, a target image is searched within the range specified by the rectangular form, and the number of dots of the image is counted, whereby setting information is obtained from a coordinate, in which an upper left position of the document image is an origin. Information regarding a character string in the preprint area, and a font, a pitch, a size, and a color of each character constituting the character string can be obtained by recognizing a character of the range specified by the rectangular form. For a character color, a character is recognized for each image information of three colors of RGB which has been outputted from the color scanner 11, and the color is determined depending on which color image or others enabled the character recognition.

If the character can be recognized by R and G images, the character can be determined to be a blue color (type). Similarly, if the character can be recognized by G and B images, the character can be determined to be a red color (type) and, if the character can be recognized by B and R images, the character can be determined to be a green color (type). Likewise, if the character can be recognized by R, G and B images, the character can be determined to be a black color (type). The document identification items that have been defined in the foregoing manner are stored to be registered as document definition information 16 in the magnetic disk unit 15.

On the other hand, each document format control information 17 is also stored to be registered in the magnetic disk unit 15, in which the document definition information 16 has been registered in the foregoing manner. The document definition information 16 and the format control information 17 are set corresponding to each other to enable access to the format control information 17 from the document definition information 16. The format control information 17 is preset for each document, and preset as a file in the magnetic disk unit 15 to be prestored as the file therein. For a setting method of the format control information 17, a conventional technology may be used, and thus detailed description thereof will be omitted. The document definition program 14 may also be constituted to set the format information 17 together with the document identification items following the execution of the document definition program 14.

Next, a character recognition operation will be described. It is assumed for character recognition that the document definition information 16 corresponding to an existing document to be read, and the corresponding format control information 17 are preregistered in the magnetic disk unit 15 as described above.

First, the color scanner 11 reads a document to be read to output document image information to the personal computer 12. In the personal computer 12, the character recognition program 13 starts its processing to start a character recognition operation. The character recognition program 13 first identifies a type of the document based on the document image entered from the color scanner 11. This document identification operation is now described based on flowcharts of FIGS. 16, 17.

Figure 6:
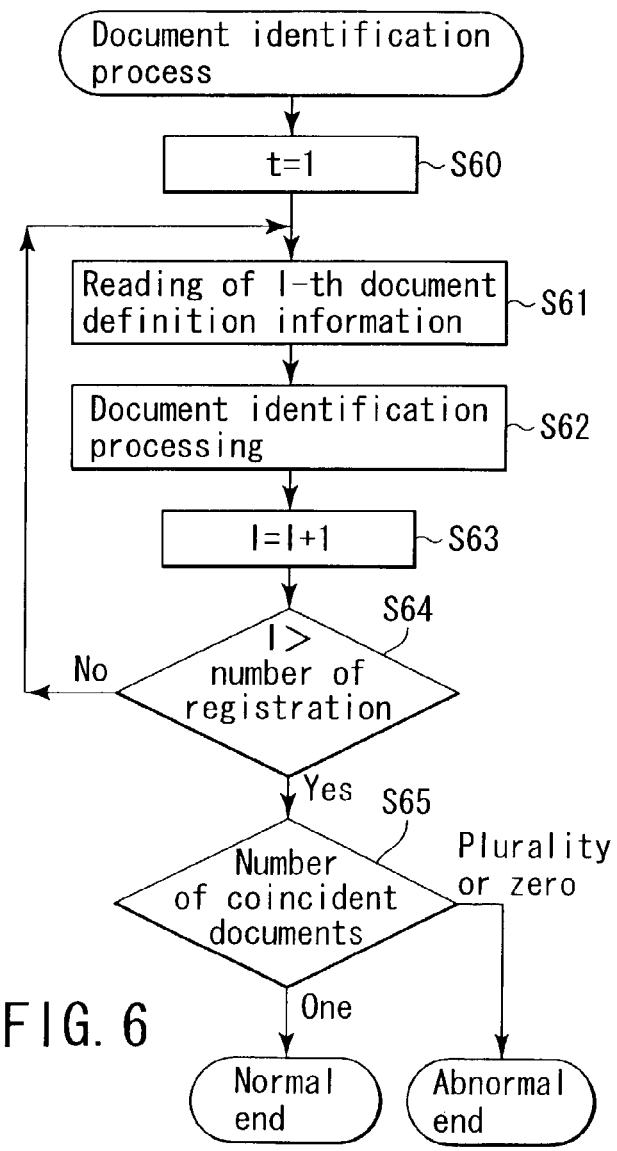
FIG. 6 is a flowchart illustrating a document identification process.

In FIG. 6, first, a variable I is set to a numerical value 1 (step S61). Then, 1st document definition information is read from the magnetic disk unit 15 (step S62). Subsequently, in step S63, document identification is executed to determine whether a document having an entered document image is identical or not to a document having the I-th document definition information.

Figure 7:
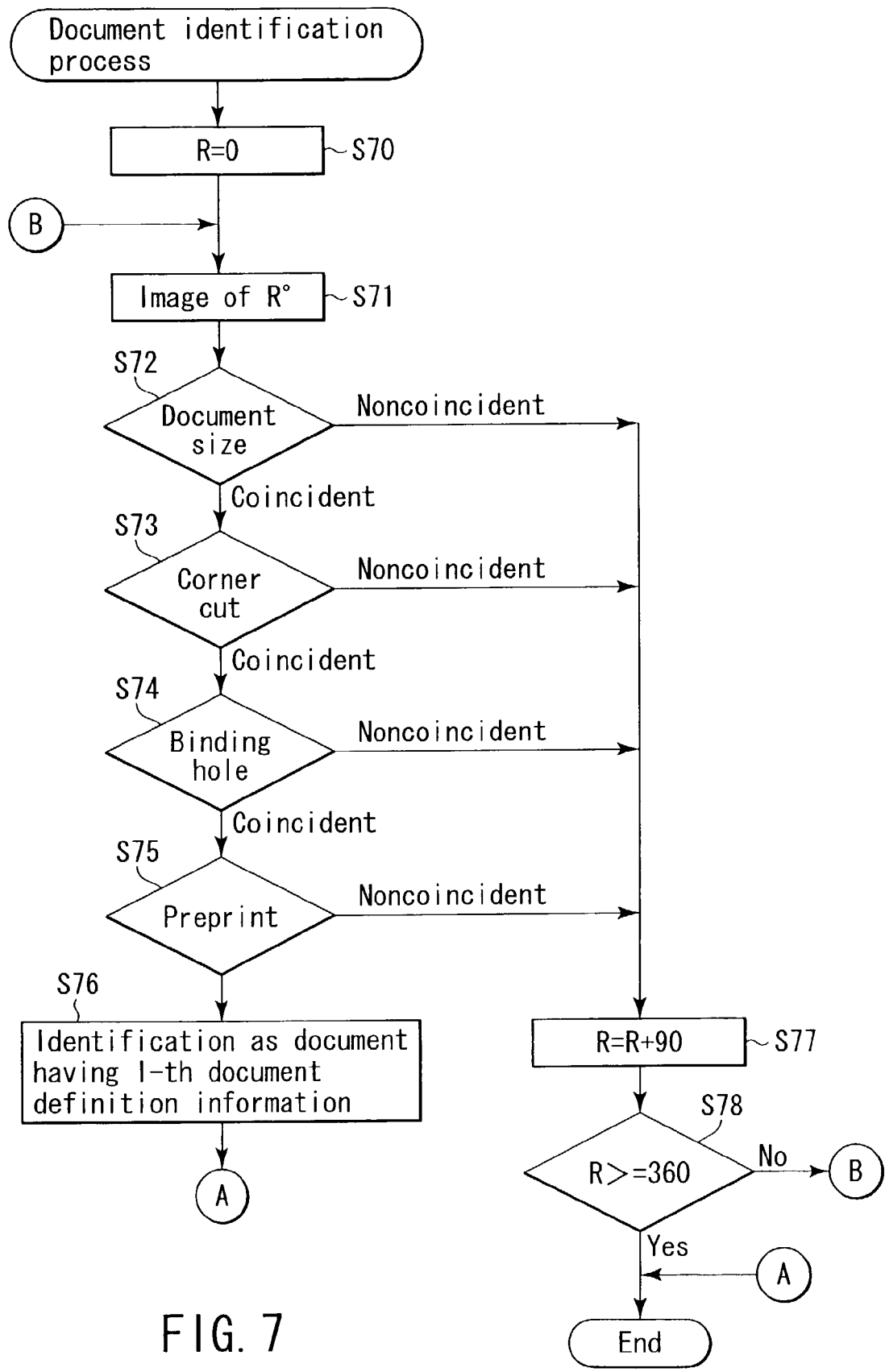
FIG. 7 is a flowchart illustrating the document identification process of the flowchart of FIG. 6.

A detail of the document identification is shown in the flowchart of FIG. 7. First, a variable R is set to a numerical value "0" (step S70). In subsequent step S71, the entered document image is rotated by R° to obtain an image. As the numerical value currently set in the variable R is "0", an image of 0°, i.e., a document image which is the entered document image maintained as it is without being rotated many times, is obtained. In subsequent steps S72 to S75, comparison is made to determine whether the document image obtained in step S71 coincides with each document identification item defined in the I-th document definition information obtained in step S61 or not.

In step S72, document size comparison is executed. The entered document image is searched to obtain vertical and horizontal lengths of the document. The vertical and horizontal lengths of the entered document are compared with the document size defined in the I-th document definition information. If a result of the comparison shows coincidence, the process proceeds to step S73. If the result shows noncoincidence, the process proceeds to step S77. If no document sizes are defined in the I-th document definition information, the process proceeds to step S73.

In step S73, corner cut comparison is executed. The entered document image is searched, and comparison is made to determine whether a corner cut of the defined size (width and height) is present or not in a position defined in the 1st document definition information. If a result of the comparison shows coincidence, the process proceeds to step S74. If the result shows noncoincidence, the process proceeds to step S77. If no corner cuts are defined in the 1st document definition information, the process proceeds to step S74.

In step S74, binding hole comparison is executed. The entered document image is searched, and comparison is made to determine whether a binding hole of the defined diameter is present or not in a position defined in the I-th document definition information. If a result of the comparison shows coincidence, the process proceeds to step S75. If the result shows noncoincidence, the process proceeds to step S77. If no corner cuts are defined in the I-th document definition information, the process proceeds to step S75.

In step S75, preprint comparison is executed. The entered document image is searched, and comparison is made to determine whether regarding a preprint defined in the I-th document definition information, a defined character string constituted of a character having a size (number of points), a font (letter type), a character pitch and a color defined in an area is present or not. This comparative determination is executed as follows. First, character recognition is executed assuming that a character string of a preprint (letter type), a character pitch and a color defined in the I-th document definition information is present. If a result of the character recognition shows that an obtained character string is identical to the defined character string, comparative determination is coincidence. If a result of the comparison shows coincidence, the process proceeds to step S76. If the result shows noncoincidence, the process proceeds to step S77. If no preprint areas are defined in the I-th document definition information, the process proceeds to step S76.

In step S76, since the entered document image coincided with each document identification item defined in the I-th document definition information in the comparative determination from step S72 to step S75, the entered document image is identified to be a document defined in the I-th document definition information. Then, the process proceeds to step S63 shown in FIG. 6.

On the other hand, if noncoincidence of the entered document image has been determined in one of the comparative determinations from step S72 to step S75, in step S77, a numerical value "90" is added to the variable R to update the variable R, and determination is made as to whether the updated variable R is equal to or higher than a numerical value "360" or not (step S78). In this determination, it is determined whether or not the comparative determination of from step S72 to step S75 is finished, in all the cases of an image obtained by rotating the entered document image by 0°, an image obtained by rotating it by 90°, an image obtained by rotating it by 180°, and an image obtained by rotating it by 270°.

When the documents to be read are loaded in the hopper of the color scanner 11, if upper tips of the documents are correctly loaded toward a feed roller, document identification can be directly executed without rotating the entered images. However, the documents are not always loaded in a correct position. On the assumption of such a case, the foregoing determination is made to execute document identification also for the images obtained by rotating the entered document image by 90°, 180°, and 270° irrespective of directions of the documents loaded in the hopper. Therefore, document identification can be executed correctly in any loading directions of the documents in the hopper of the color scanner 11.

If a result of the determination in step S78 shows that the variable R is equal to/lower than the numerical value of "360", the process returns to step S71 and, thereafter similarly, the process from step S71 to step S77 is carried out. If the variable R becomes equal to/higher than the numerical value "360", the process proceeds to step S63 shown in FIG. 6.

In step S63, a numerical value "1" is added to the variable I to determine whether a numerical value of the variable I exceeds the number of definition information registered in the document definition information 16 or not. In this determination, whether the entered document images exceeded the number of definition information registered in the document definition information 16 or not is determined. In this determination, whether document identification has been executed or not for the entered document images by using all the document definition information registered in the document definition information 16 is determined. If comparison with all the document definition information has not been finished, the process returns to step S61 and, thereafter similarly, the process from step S61 to step S63 is carried out. If it is determined in step S64 that the document identification using all the document definition information has been finished, the process proceeds to step S65.

In step S65, determination is made as to whether the number of the entered document images coincident with the document definition information registered in the document definition information 16 in step S62 is one or more. If the number of coincident images is one, the document identification is normally finished. In this case, the document having the entered document image is a document defined by only document definition information identified in step S76. If the number of coincident images is zero, the document identification is abnormally finished.

After the identification of the document definition information coincident with the entered document image, format control information corresponding to the coincident document definition information is read from the format control information 17. The character recognition program 13 executes character recognition from the entered document image by using the read format control information. If a sorter is connected to the optical character reader 10, documents after character recognition are discharged to the plurality of document discharge pockets in accordance with types by the sorter to be sorted.

As an example of implementing the present invention which can be expected to provide great effects, there is character reading of payment notices of fixed property tax, city planning tax, and a water rate issued by a local government or the like at a financial institution. Such notices are documents designed by each local government or the like exclusively for OCR processing in its own information processing system. However, seen from OCR processing at the financial institution, such documents are only existing documents. Therefore, when a request of transfer of various fees based on such notices is received from a customer, it has heretofore been necessary to manually sort hundreds of types of such documents in accordance with issuing groups and types of notices, and to calculate a sum total of transfer amounts for each sorted notice.

Application of the present invention to such processing greatly facilitates identification of documents, hundreds of types of which have been independently designed to be presented. Thus, by recognizing characters of the documents, character recognition of transfer amounts can be easily realized, and character recognition of a total amount for each notice can be easily realized, whereby automatic calculation of a total amount for each notice can be realized. Moreover, by providing the OCR with the sorter, the documents after the end of character recognition can be sorted in accordance with types. Therefore, calculation of a total amount and sorting of documents in accordance with types, which have conventionally been carried out manually, can all be processed mechanically, whereby processing efficiency can be greatly improved.

Next, description will be made of the embodiment of the present invention with reference to the drawings.

Figure 8:
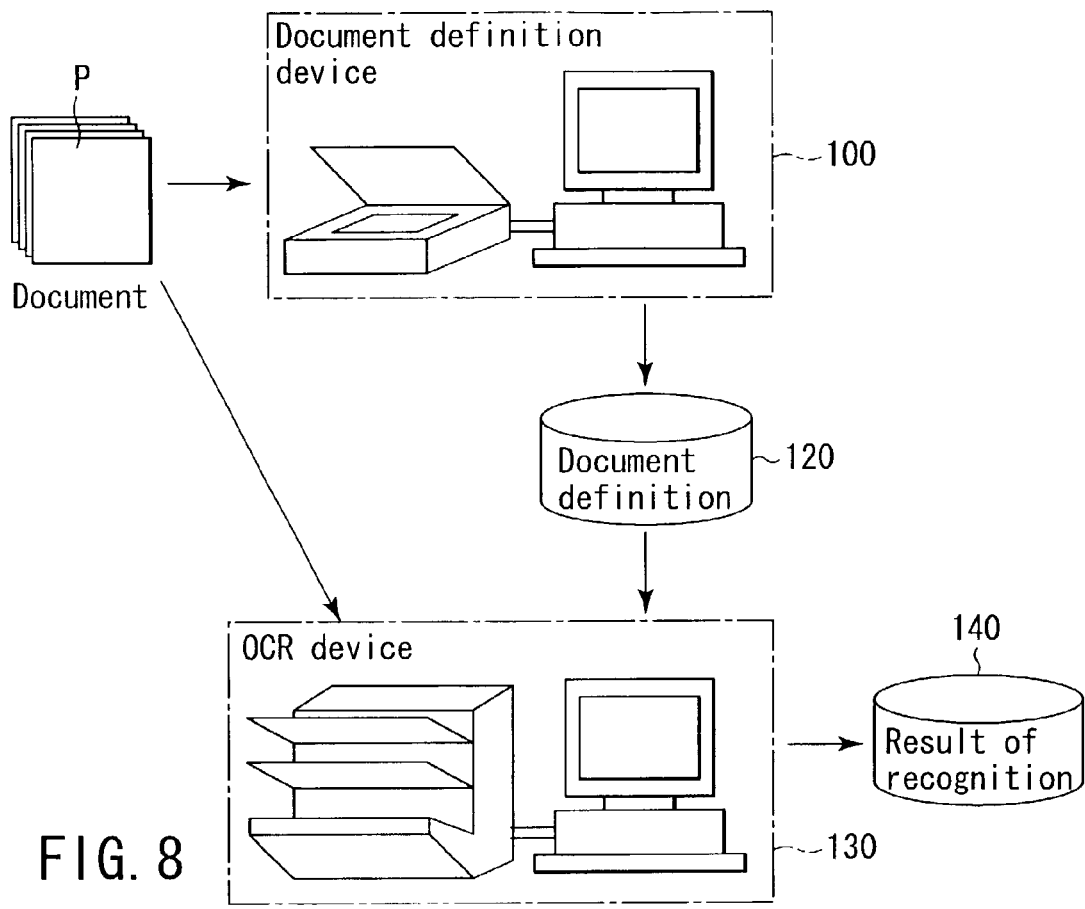
FIG. 8 is a block diagram showing a configuration of an OCR device provided with a document identification device according to a second embodiment of the present invention.

FIG. 8 is a block diagram showing a configuration of an OCR device provided with a document identification device according to the embodiment of the present invention.

In FIG. 8, a document definition device 100 comprises a scanner, and creates document definition 120 for each type of a document (P). An OCR device 130 identifies the type of the document (P) to recognize characters based on the document definition 120 created by the document definition device 100, and outputs a recognition result 140. Hardware configuration shown in FIG. 8 is basically identical to that of a conventional OCR system. According to the present invention, a function (identification item of plane area) of adding a plane area to each of documents to be identified, and checking the plane area on the document (P) is added to the document definition 120. In FIG. 8, the document definition device 100 and the OCR device 130 may be integrally constituted. Here, the plane area means, for example a blank area. However, when a red document is seen by a red light source, it is seen to be blank. Similarly, when a green document is seen by a green light source, it is seen to be blank. Thus, a blank area (unrecorded area) is referred to as a plane area hereinafter.

Figure 9:
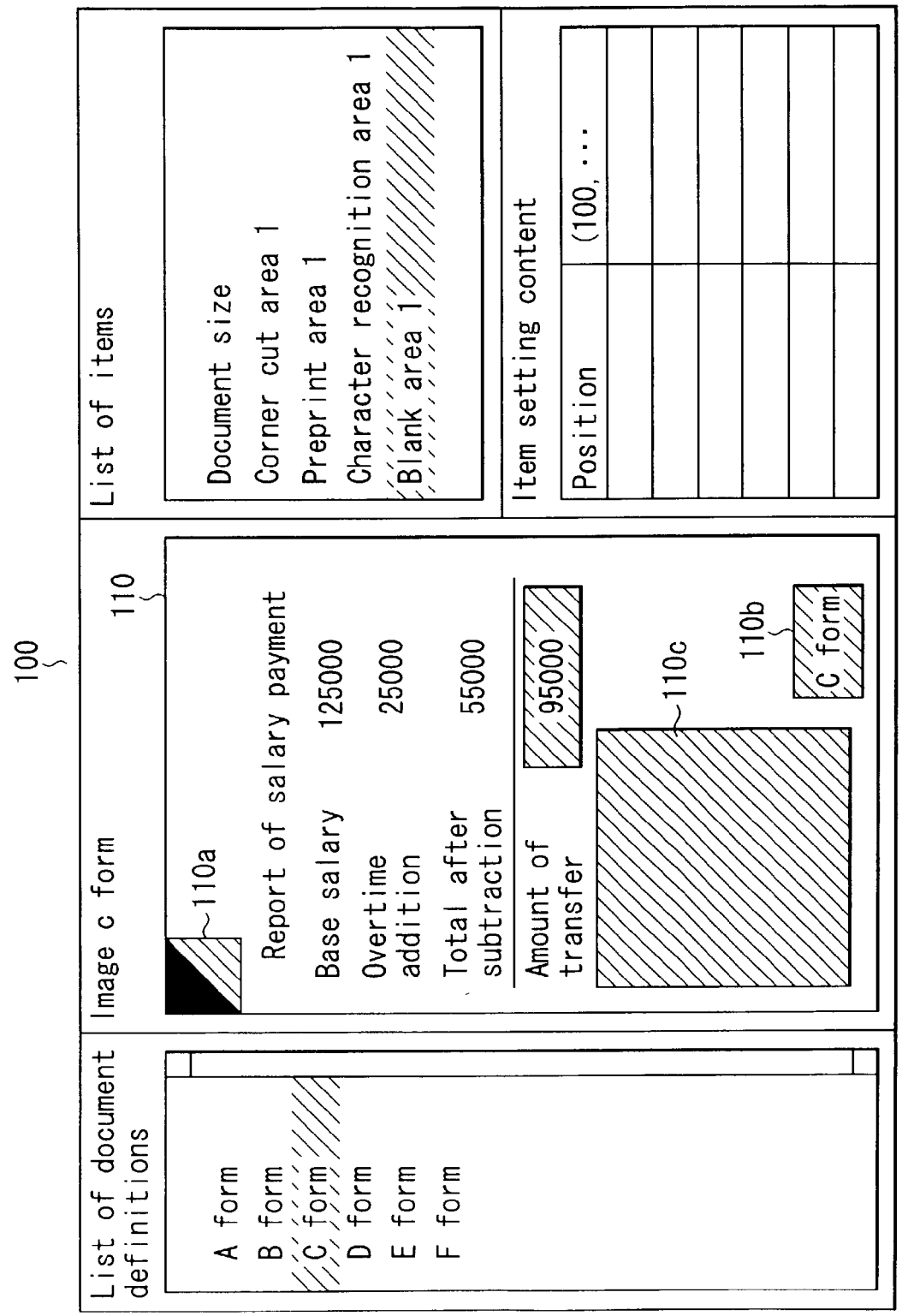
FIG. 9 is a view showing a screen structure example of a document definition device for illustrating a structure of document definition according to the second embodiment of the invention.

FIGS. 9 and 10 are explanatory views each showing a structure of the document definition 120 of the embodiment of the present invention. FIG. 9 shows a screen structure example of the document definition device 100, and FIG. 10 shows an example of a field setting content of the document definition.

In the screen structure of the document definition device 100 shown in FIG. 9, a reference numeral 110 denotes an entire document image of the document P read by the scanner, and reference numerals 110a to 110c denote identification item areas to be checked on the document P. The reference numeral 110a denotes a corner cut area, and the reference numeral 110b denotes a preprint area. The reference numeral 110c denotes a blank area to be newly added in the embodiment of the invention.

In the processing at the document definition device 100, first, an operation of preparing one document for each type, and reading an image by the scanner is carried out. Then, for each read document, document definition 120 having a plurality of identification items is created, which has a definition content similar to that shown in FIG. 10. Here, in document identification items, identification items of a document (sheet) size, a corner cut area 11a, a binding hole area (not shown), and a preprint area 110b are defined for each of a plurality of documents P to be identified. The blank area 110c on the document P processed here indicates an area of a monochromatic part (normally blank part), in which no characters or symbols are recorded, on the document P.

Figure 11:
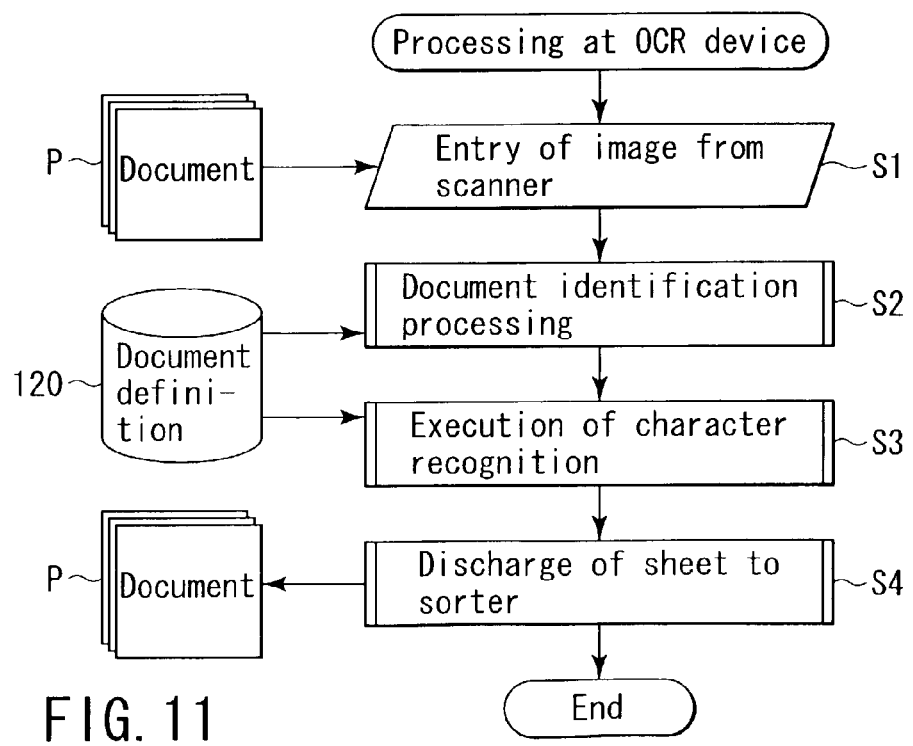
FIG. 11 is a flowchart showing in outline a process flow of the OCR device according to the second embodiment of the invention.
Figure 12:
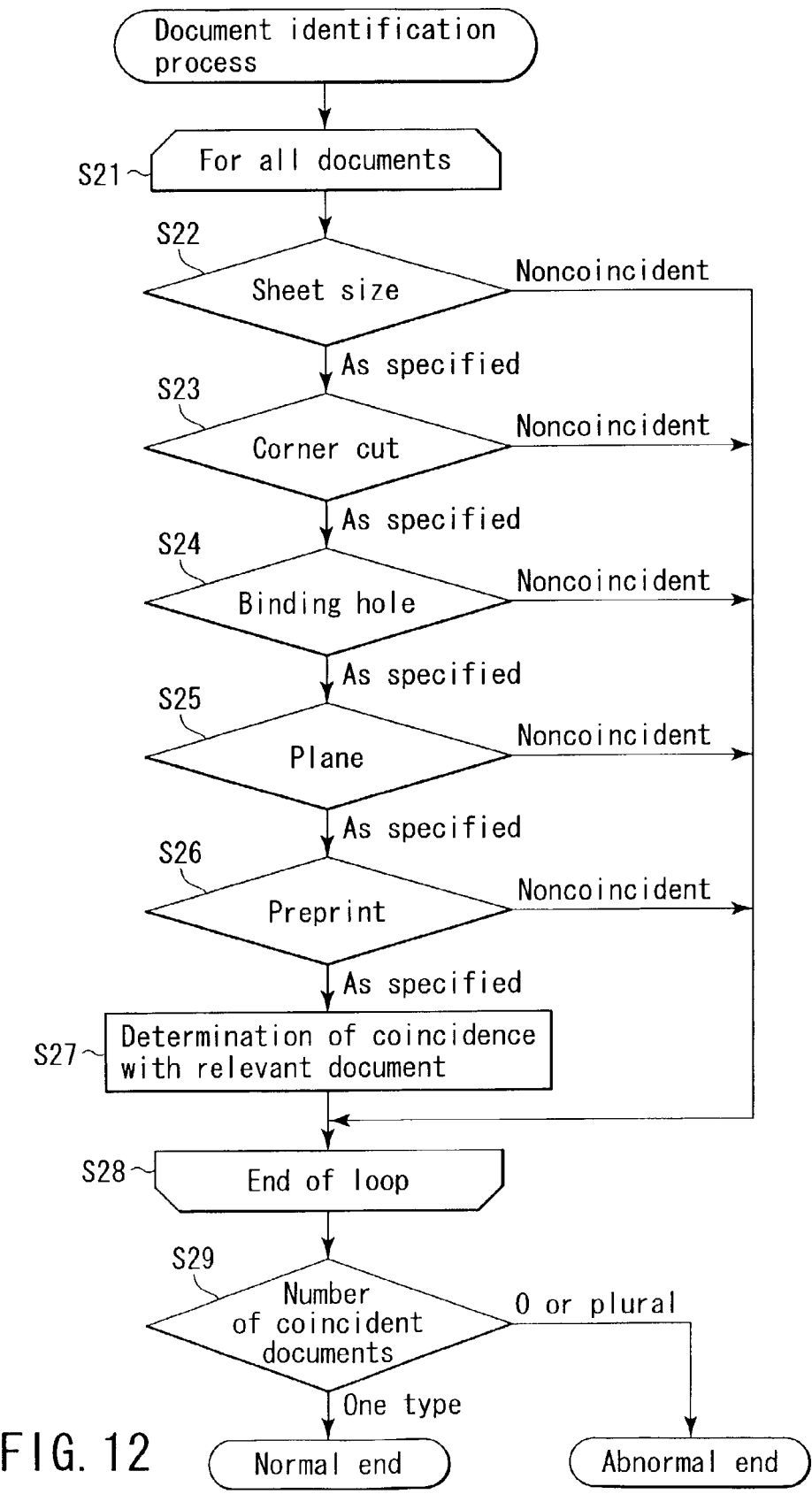
FIG. 12 is a flowchart showing a process of document identification of FIG. 11.

In the processing at the OCR device, based on the document definition 120 shown in FIG. 10, which has been defined by the document definition device 10, the document P is identified to recognize a character. A flow of this processing is shown in FIG. 11, and a detail of a process of document identification (step S2) of FIG. 11 is shown in FIG. 12. In the document identification, identification items of the plane area 110c are checked before check of identification items of the preprint area 110b necessary for character recognition.

Now, description will be made of a document identification operation according to the embodiment of the present invention by referring to the above-described drawings.

At the OCR device 130, a series of operations are carried out. That is, an image of each of the document P to be processed is read by the scanner (step S1 of FIG. 11) to identify the document P in accordance with document definition having a plurality of identification items including identification items similar to those shown in FIG. 10 (step S2 of FIG. 11), and character recognition is executed (step S3 of FIG. 11) to output a result to the sorter (step S4 of FIG. 11). In this case, if a sorter having a plurality of output pockets is connected, the documents can be sorted in accordance with types. If an identification error occurs, processing such as outputting of the document to the rejection pocket is carried out.

Now, the document identification (step S2 of FIG. 11) of the series of operations (steps S1 to S4 of FIG. 11) is described in detail.

In the document identification, the read images of the documents are sequentially compared one by one with the document definition 120 of the respective types of created documents to check coincidence for all the items (steps S21 to S29 of FIG. 12).

According to the embodiment, first, checking is executed as to whether a "sheet size" coincides with a document size registered in the document definition 20 or not (step S22 of FIG. 12). Here, if the sheet size does not coincide with the registered document size, the process proceeds to an operation by next document definition.

On the other hand, if coincidence is determined (as specified), then, checking is executed as to whether a "corner cut" is as specified or not by a corner cut area registered in the document definition 120 (step S23 of FIG. 12). Here, if the corner cut is not as specified, the process proceeds to an operation by next document definition.

On the other hand, if the corner cut is as specified, then, checking is executed as to whether a "binding hole" is as specified or not by a binding hole area registered in the document definition 120 (step S24 of FIG. 12). Here, if the binding hole is not as specified, the process proceeds to an operation by next document definition.

On the other hand, if the binding hole is as specified, then, checking is executed as to whether a "plane area" added in the embodiment of the invention is as specified or not before check of a "preprint" (step S25 of FIG. 12). Here, if the plane area is not as specified by a plane area registered in the document definition 120, the process proceeds to an operation by next document definition.

Figure 13:
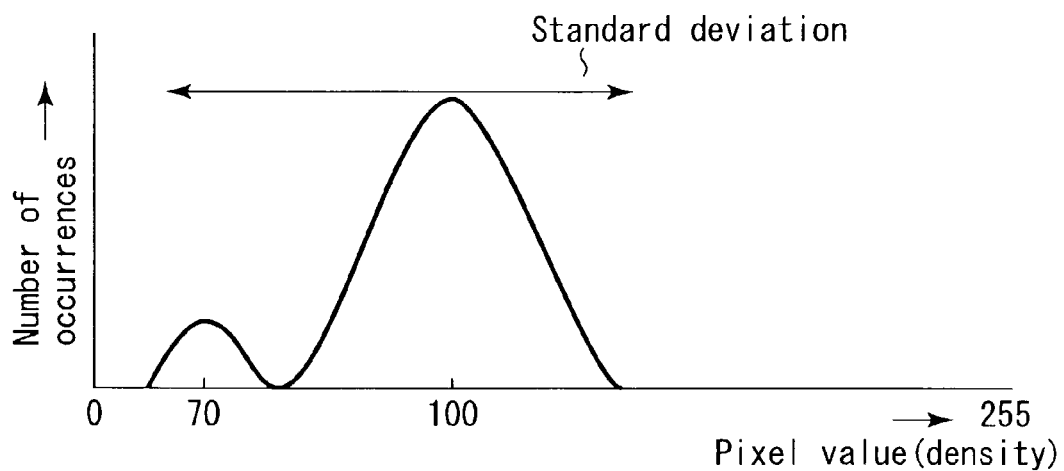
FIG. 13 is a view of pixel distribution in an area when there is a character according to the second embodiment of the invention.
Figure 14:
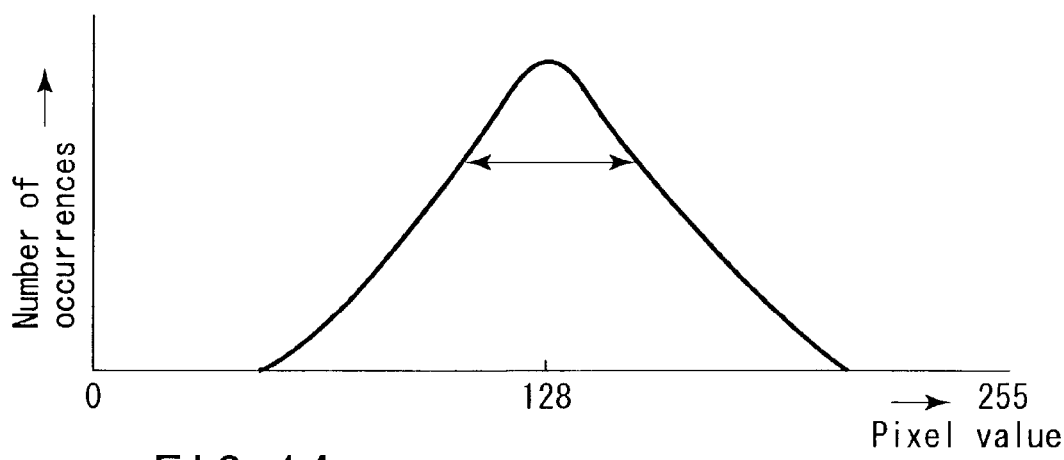
FIG. 14 is a view of pixel distribution in a gray area according to the second embodiment of the invention.
Figure 15:
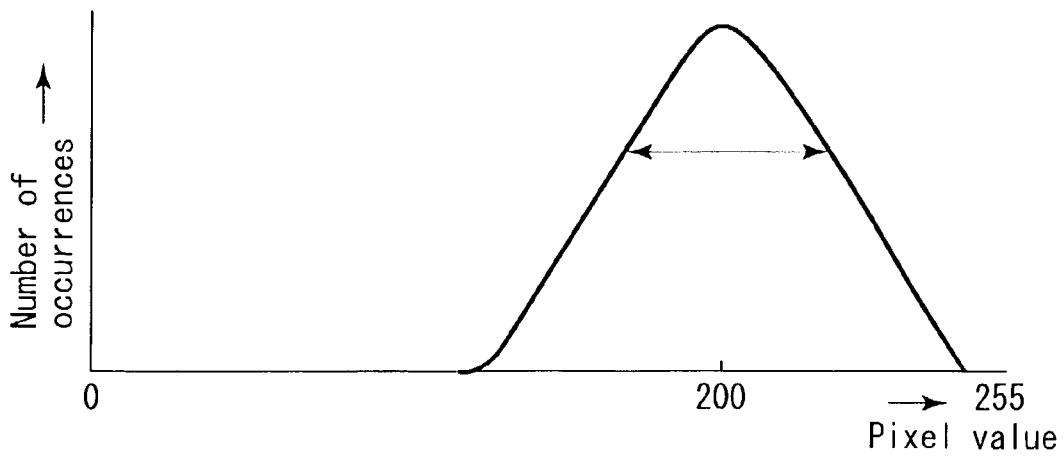
FIG. 15 is a view of pixel distribution in a white area according to the second embodiment of the invention.

Determination of the plane area is made based on a pixel distribution state in the area. FIGS. 13 to 15 are views of pixel distribution in the area. An ordinate shows a number of occurrences, and an abscissa shows a pixel value. As pixel values, for example there are 0 to 255. Black is 0, and white is 255. FIG. 13 shows a pixel distribution view when there is a character in a white background, FIG. 14 shows a pixel distribution view when a plane area is gray, and FIG. 15 shows a pixel distribution view when a plane area is white. If there is a fixed width of distribution (standard deviation), black pixels (character pixels) are considered to be included. As whether standard deviation is equal to/higher than a fixed value or not is checked, when only dust sticks, presence of characters is never erroneously recognized. Normally, black pixels (pixels constituting a character) are determined when a pixel value is smaller than 128, and white is determined when a pixel value exceeds 128. That is, a light is radiated to white paper, and a signal level when its reflected light is read by a charge coupled device (CCD) is tuned. Ranges of signal levels when white appears, and signal levels of reflected lights of a deep-black area are divided into 256 from 0 to 255 to allocate numerical values in accordance with levels. A color becomes blacker nearer to 0, and whiter nearer to 255. Which plane area is seen varies from document to document (registered in document definition shown in FIG. 10).

About 80% of all the documents is rejected by check of a document size, a corner cut, and a binding hole. Remaining 20% becomes a plane area to be checked. Thus, considering a case of character recognition for 1000 documents, 200 documents are still targeted for character recognition to require considerable time. Experientially, about half of 20% is rejected by checking the plane area. As a result, 10% of all the documents becomes a target for character recognition.

The check of the document size, the corner cut and the binding hole can be executed simply by table comparison, and thus not much time is required. Therefore, even if the plane area is checked, overall time necessary for checking can be shortened.

On the other hand, if the plane area is as specified, then, checking is executed as to whether a "preprint" is as specified or not by a preprint area registered in the document definition 120 (step S26 of FIG. 12). Then, when the preprint is as specified, coincidence with the document is determined (step S27 of FIG. 12).

The checking in accordance with the series of the document definitions is repeatedly executed for all the types of documents (document formats) to become targets for identification while switching a content (parameter) of the document definition 120 (steps S21 to S28 of FIG. 12). For all the checked document definitions, only when a document to be checked is in accordance with only one type of document definition (i.e., only when coincident document definition is only one type), the document is set as a result of identification (step S29 of FIG. 12). On the other hand, if the number of coincident document definitions is a plurality or 0 (not present), the identification becomes an error (abnormal end).

Thus, in the document identification for identifying the documents in accordance with the document definition based on the plurality of identification items, in addition to the document definition 120 of the plane area of each of the documents to be identified, the function of checking the plane area 110c on the document P is executed before check of the "preprint" accompanied by character recognition, whereby the number of times of proceeding to check of the "preprint" accompanied by character recognition, which requires considerable time for processing, is reduced to carry out efficient document identification. That is, the check of the plane area 110c is considerably higher in speed than the check by character recognition. Accordingly, by checking the plane area 110c, the number of document definitions necessary for character recognition can be greatly reduced to greatly increase an entire processing speed without damaging the identification function.

Next, description will be made of another embodiment of the present invention by referring to FIGS. 16A and 16B.

According to the embodiment shown in FIGS. 16A and 16B, in the check of the plane area 110c in the foregoing embodiment, it is not necessary to strictly check that the pixels included in the plane area 110c are all white, and only a capability of reducing document definitions for character recognition is necessary. From this standpoint, as shown in FIG. 16A, only properly thinned pixels (shaded part) are checked to enable higher-speed execution of document identification. In addition, in a system having large cache performance and a high continuous accessing speed to the memory, as shown in FIG. 16B, a much higher speed can be expected by checking pixels continuous in a given section obliquely.

FIG. 17 is a view showing an example of a field setting content of another document definition. Here, in document identification items, for each of a plurality of documents (p) to be identified, identification items of a document (sheet size), a corner cut area, a binding hole area (not-shown), a plane area, and preprint area are set and, further, in addition to these identification items, an identification item of a character existing area is defined. The plane area on the document (p) processed here indicates an area of a monochromatic part (normally blank part), in which any characters, symbols or the like are not recorded, on the document.

The character existing area indicates an area, in which, for example numerals, symbols or characters are always printed within a predetermined range of digits.

Figure 18:
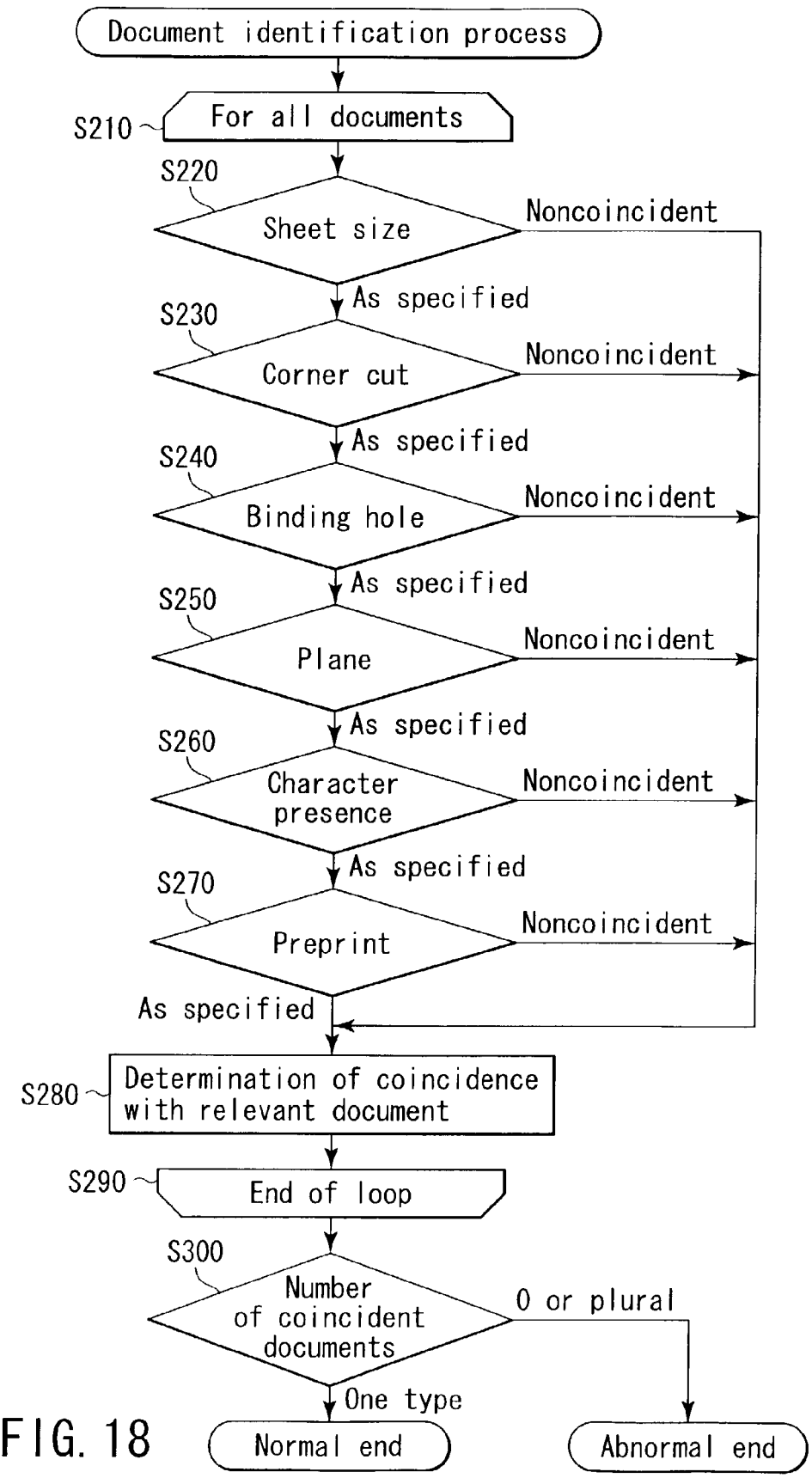
FIG. 18 is a flowchart showing a process of document identification according to the fourth embodiment of the invention.

In processing at an OCR device 130, documents are identified based on document definition 200 shown in FIG. 17 which is created by the document definition device, to recognize characters. A detail of a process of document identification is shown in FIG. 18. In this document identification, the identification item of the character existing area is checked before check of the identification item of the preprint area necessary for character recognition.

Now, the document identification shown in FIG. 18 will be described.

In the document identification, read images of documents are sequentially compared one by one with the document definition 200 of the respective types of created documents to check coincidence for all the items (steps S210 to S300 of FIG. 18).

First, checking is executed as to whether a "sheet size" coincides with a document size registered in the document definition 200 or not (step S220 of FIG. 18). Here, if the sheet size does not coincide with the registered document size, the process proceeds to an operation by next document definition.

On the other hand, if coincidence is determined (as specified), then, checking is executed as to whether a "corner cut" is as specified or not by a corner cut area registered in the document definition 200 (step S230 of FIG. 18). Here, if the corner cut is not as specified, the process proceeds to an operation by next document definition.

On the other hand, if the corner cut is as specified, then, checking is executed as to whether a "binding hole" is as specified or not by a binding hole area registered in the document definition 200 (step S240 of FIG. 18). Here, if the binding hole is not as specified, the process proceeds to an operation by next document definition.

On the other hand, if the binding hole is as specified, then, checking is executed as to whether a "plane area" is as specified or not by a plane area registered in the document definition 200 (step S250 of FIG. 18). Here, if the plane area is not as specified, the process proceeds to an operation by next document definition.

On the other hand, if the plane area is as specified, then, checking is executed as to whether a character existing area is as specified or not by a character existing area registered in the document definition 200 before check of a next "preprint" (step S260 of FIG. 18). Here, if the character existing area is not as specified, the process proceeds to an operation by next document definition.

On the other hand, if the character existing area is as specified, then, checking is executed as to whether a "preprint" is as specified or not by a preprint area registered in the document definition 200 (step S270 of FIG. 18). Then, if the preprint is as specified, coincidence with the document is determined (step S280 of FIG. 18).

The checking in accordance with the series of the document definitions is repeatedly executed for all the types of documents (document formats) while switching a content (parameter) of the document definition 20 (steps S210 to S290 of FIG. 18). For all the checked document definitions, only when a document to be checked is in accordance with only one type of document definition (i.e., only when coincident document definition is only one type), the document is set as a result of identification (step S300 of FIG. 18). On the other hand, if the number of coincident document definitions is a plurality or 0 (not present), the identification becomes an error (abnormal end).

Thus, in the document identification for identifying the documents in accordance with the document definition based on the plurality of identification items, in addition to the document definition 200 of the character preset area of each of the documents to be identified, the function of checking the character existing area on the document is executed before check of the "preprint" accompanied by character recognition, whereby the number of times of proceeding to check of the "preprint" accompanied by character recognition, which requires considerable time for processing, is reduced to carry out efficient document identification. That is, a check speed of the plane area is considerably higher than a check speed by character recognition. Accordingly, by checking the plane area, the number of document definitions necessary for character recognition can be greatly reduced to greatly increase an entire processing speed without damaging the identification function.

Furthermore, according to the present invention, the character existing area is used for only identifying the type of a document, and includes no character recognition operations at all. In the above-described checking regarding the character existing area (step S260 of FIG. 18), whether something similar to a character is actually present or not in the character existing area defined in the document definition 200 is only checked, and character recognition is not executed. Thus, checking can be carried out at a very high speed.

Now, description will be made of specific check of the character existing area by referring to FIGS. 19 to 22.

Figure 19:
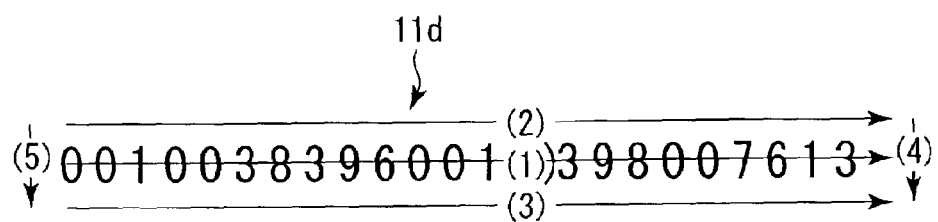
FIG. 19 is an explanatory view showing a specific checking method of a character existing area according to the fourth embodiment of the invention.

FIG. 19 shows an example where a numeral of given digits called character font "OCR-B" for character recognition prescribed in technical standard numbering JISX9002 of Japanese Industrial Standards, is always printed on a document.

In the check of the character existing area, first, based on the character existing area defined in the document definition 200, an image of the character existing area is cut out from the image read by the scanner. Then, as shown in FIG. 19, pixels on a center of a line indicated by (1) are investigated horizontally to check that black and white pixels always appear alternately (for each interval of characters). Here, if black or white pixels continue by a given number or more, it is determined that the number of digits in the position is different from a specified length, or something other than a character is present in the position. If such determination is made, "noncoincidence" becomes a result. Then, in order of codes (2), (3), (4), and (5) of FIG. 19, checking is executed as to whether a plane area is present or not on each line of upper, lower, left and right sides of the character existing area. In the case of a normal OCR document, a blank area called "clear area" is secured on each of upper, lower, left and right sides of the character existing area. Accordingly, pixels in this clear area are investigated horizontally or vertically to check that white pixels continue. Here, if there are black pixels in the clear area, "noncoincidence" becomes a result.

Figure 20:
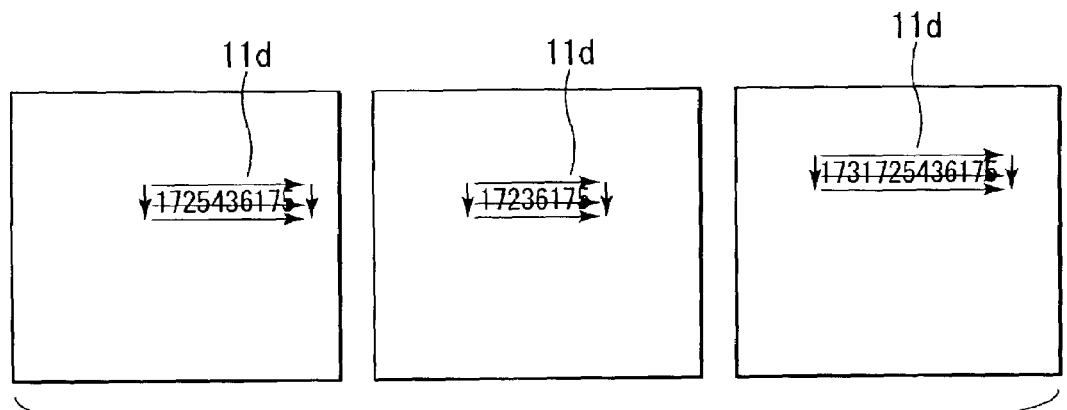
FIG. 20 is an explanatory view showing a specific checking method of a character existing area according to the fourth embodiment of the invention.

FIG. 20 shows an example where a character existing area is identified in each of three types of documents different from one another in character existing area forms by using the foregoing check method.

In order to identify three types of documents similar to those shown in FIG. 20, character presence in a specified character existing area is checked for each of the three types of the documents. Here, pixels are investigated in one direction five times for each document. Therefore, presence of a character recognition area of a specified size in the position can be checked at a very high speed.

As such a similar document identification method, there is a method of identification using "what digit of a character is present in a character recognition area" as a key. According to this method, an image of a predetermined position is cut out, and characters therein are subjected to layout analysis to determine the number of characters. However, in this method, the layout analysis took time, and cases to be identified only by the numbers of digits are limited. Consequently, a very large clear area is necessary.

According to the present invention, the system is employed which uses the character existing area only for increasing a speed of document identification and which checks presence of something similar to a character. Thus, strict layout analysis is not necessary, and a processing speed becomes high. A preprint character string is lastly used as a key for identification to apply the system to more document identifications than the conventional system. Further, since a different character existing area can be defined for each document, it is not necessary to define a very large clear area different from the case of the conventional method. The character existing area is often identical to a character recognition area to provide an advantage of using the character recognition area in the document definition device.

The foregoing check method of the character existing area shown in FIG. 19 can be applied only to a case where there is always a numeral of a fixed number of digits as in the case of the JISB area.

Figure 21:
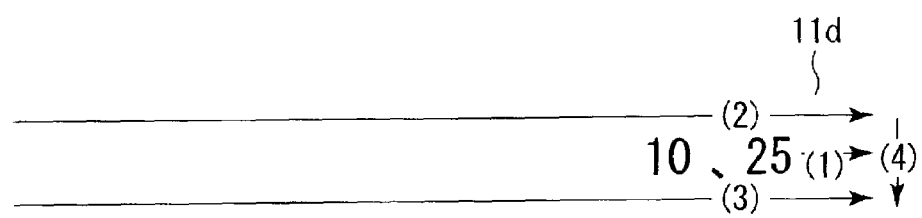
FIG. 21 is an explanatory view showing a specific checking method of a character existing area according to the fourth embodiment of the invention.

Thus, FIG. 21 shows a check method when the number of digits is unclear. In this example, when a character existing area is an amount of money, by using constant presence of a numeral of one digit or more, presence of a last one digit, and clear area of upper, lower, left and right sides are checked.

Figure 22:
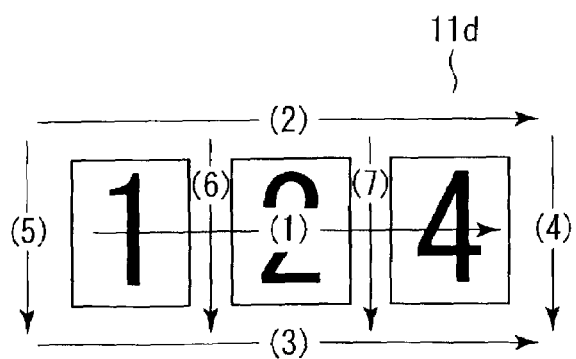
FIG. 22 is an explanatory view showing a specific checking method of a character existing area according to the fourth embodiment of the invention.

Further, FIG. 22 shows a check method in the case of handwriting. In this example, presence of each numeral (pattern similar to a character, where black and white alternately appear) in a character existing area, and a clear area of each of upper, lower, right and left sides of the character existing area, and an interval of characters are checked. In the case of a handwriting area, as character protrusion may occur, a blank area is checked softly considering the protrusion, whereby accurate area check can be carried out.

The above embodiment has been described by way of an example where the black character is read by the white light source. However, if a color is used in a part not for character recognition on the document, in order to prevent reading of this part, i.e., to drop this part out, a light source is used in accordance with a color recorded on the document, and reading is executed by this light source, whereby processing can be carried out as in the case of reading the black character by the white light source. That is, there is a case where a color visible to humans but unreadable by machines is applied to a part of a document not for character recognition. As visibility is inhibited, reading may be executed by using a light source to drop the color out in such a case. For example, if there is a red frame around a character recognition area, a red light source is used to read a character.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A document identification device, comprising:
document definition means for holding a plurality of pieces of document identification information;
document size determination means for determining whether or not a sheet size matches a document size registered in the document definition means;
corner cut determination means for determining whether or not a corner is cut within a specified corner cut area registered in the document definition means, given that the document size determination means determines that the sheet size matches the document size registered in the document definition means;
binding hole determination means for determining whether or not a binding hole is opened within a specified binding hole area registered in the document definition means, given that the corner cut determination means determines that the binding hole is opened within the specified binding hole area registered in the document definition means;
plane area determination means for making a determination, before checking a preprint, of whether or not a plane area lies within a specified plane area registered in the document definition means, given that the binding hole is opened within the specified binding hole;
character existing area determination means for determining whether or not a character existing area is within a specified character existing area registered in the document definition means, given that the plane area is within the specified plane area registered in the document definition means;
preprint area determination means for making a determination of whether or not the preprint is within a specified preprint area registered in the document definition means, given that the character existing area is within the specified character existing area registered in the document definition means; and
means for determining that a document matches a predetermined document, given that the preprint is within the specified preprint area registered in the document definition means.

2. The document identification device according to claim 1, wherein the plane area is defined by thinning the plane area per predetermined pixels.

3. The document identification device according to claim 1, further comprising:
means for identifying a document in accordance with a document definition predetermined based on a plurality of identification objects; and
means for identifying a document in accordance with a document definition including an identification object, which defines a character existing area.

4. The document identification device according to claim 1, further comprising:
means for identifying a document in accordance with a document definition predetermined based on a plurality of identification objects including an identification object required for character recognition;
means for identifying a document in accordance with a document definition for determining an identification object, which defines a character existing area and a blank area around a character existing area, before determining an identification object required for character recognition.

5. The document identification device according to claim 3, wherein determination of an identification object defining a character existing area is executed by determining pixel values in a longitudinal direction and a vertical direction of the character existing area, without having to perform a labeling process.

6. The document identification device according to claim 4, wherein determination of an identification object defining a character existing area is executed by determining pixel values in a longitudinal direction and a vertical direction of the character existing area, without having to perform a labeling process.

7. The document identification device according to claim 1, wherein the preprint means further comprises:
   means for inspecting pixels on a center of a character string horizontally, to check that black and white pixels appear alternately;
   means for determining that a length of a number of digits at a predetermined position is longer than a specified length, or determining that a non-character portion exists at the predetermined position;
   means for checking whether or not there is a plane area on each of upper, lower, left and right sides of a character existing area; and
   means for determining that noncoincidence is a determination result, if a black pixel exists in the plane area.

8. A document identification method comprising:
   determining whether or not a sheet size matches a document size registered in the document definition means;
   determining whether or not a corner is cut within a specified corner cut area registered in the document definition means, given that the document size determination means determines that the sheet size matches the document size registered in the document definition means;
   determining whether or not a binding hole is opened within a specified binding hole area registered in the document definition means, given that the corner cut determination means determines that the binding hole is opened within the specified binding hole area registered in the document definition means;
   making a determination, before checking a preprint, of whether or not a plane area lies within a specified plane area registered in the document definition means, given that the binding hole is opened within the specified binding hole;
   determining whether or not a character existing area is within a specified character existing area registered in the document definition means, given that the plane area lies within the specified plane area registered in the document definition means;
   making a determination of whether or not the preprint is within a specified preprint area registered in the document definition means, given that the character existing area is within the specified character existing area registered in the document definition means; and
   determining that the document matches a predetermined documents, given that the preprint is within the specified preprint area registered in the document definition means.

9. The document identification method according to claim 8, wherein the plane areais defined by thinning the plane area per predetermined pixels.

10. The document identification method according to claim 8, further comprising:
    identifying a document in accordance with a document definition predetermined based on a plurality of identification objects; and
    identifying a document in accordance with a document definition including an identification object, which defines a character existing area.

11. The document identification method according to claim 8, further comprising:
    identifying a document in accordance with a document definition predetermined based on a plurality of identification objects including an identification object required for character recognition; and
    identifying a document in accordance with a document definition for determining an identification object, which defines a character existing area and a blank area around a character existing area, before determining an identification object required for character recognition.

12. The document identification method according to claim 9, further comprising determining an identification object, which defines a character existing area, by determining pixel values in a longitudinal direction and a vertical direction of the character existing area, without having to perform a labeling process.

13. The document identification method according to claim 10, further comprising determining an identification object, which defines a character existing area, by determining pixel values in a longitudinal direction and a vertical direction of the character existing area, without having to perform a labeling process.

14. The document identification method according to claim 8, further comprising:
    inspecting pixels on a center of a character string horizontally, to check that black and white pixels appear alternately;
    determining that a length of a number of digits at a predetermined position is longer than a specified length, or determining that a non-character portion exists at the predetermined position;
    checking whether or not there is a plane area on each of upper, lower, left, and right sides of a character existing area; and
    determining that noncoincidence is a determination result, if a black pixel exists in the plane area.

* * * * *